E. C. KELLY, Jr.
SEPARATOR TRAP.
APPLICATION FILED AUG. 25, 1913.
1,085,135.
Patented Jan. 27, 1914.
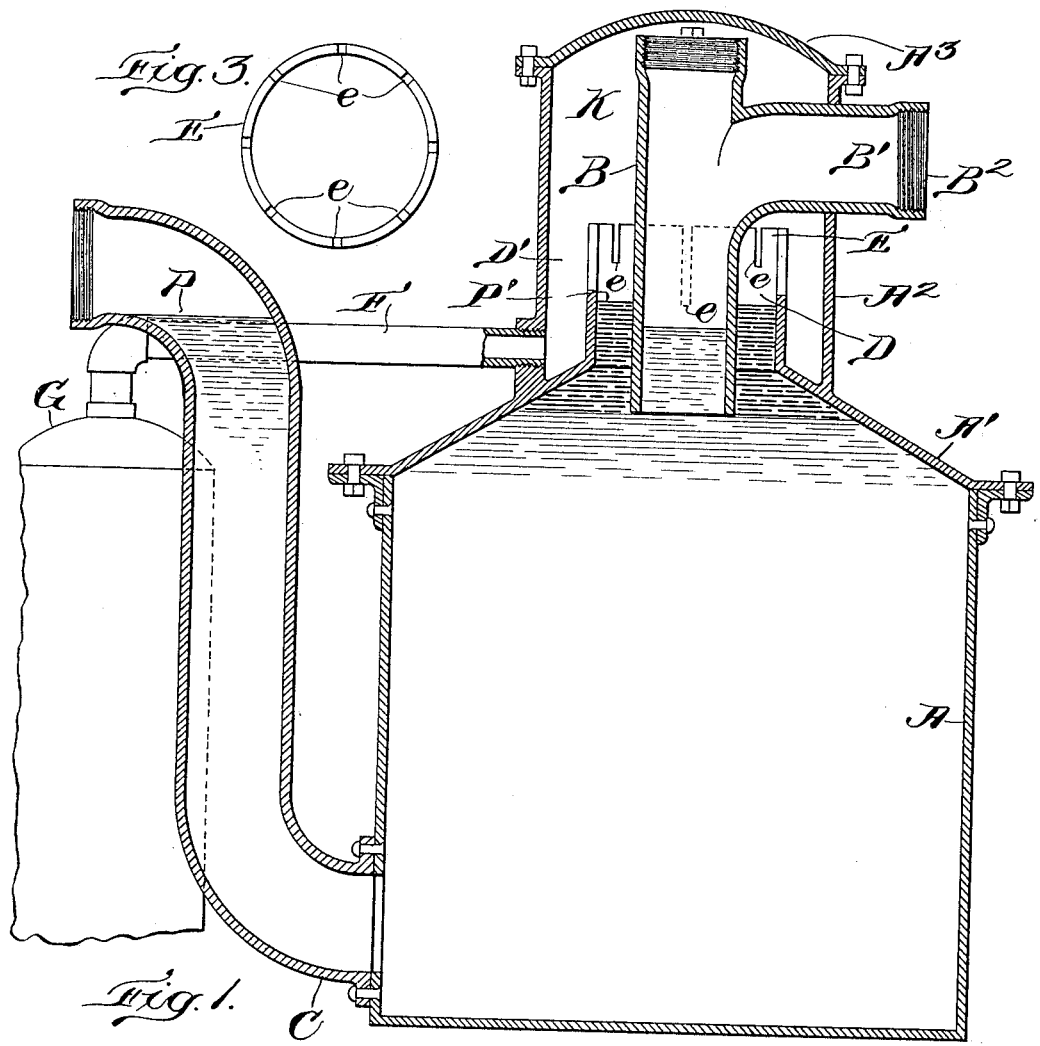
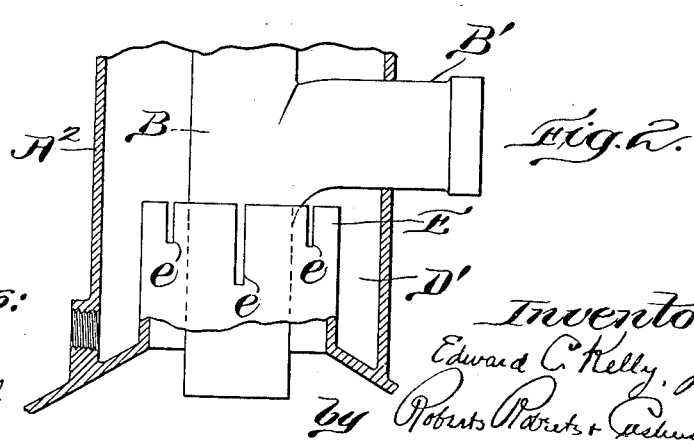

UNITED STATES PATENT OFFICE.

EDWARD C. KELLY, JR., OF BOSTON, MASSACHUSETTS, ASSIGNOR TO KELLY SEPARATOR COMPANY, OF BOSTON, MASSACHUSETTS, A CORPORATION OF MASSACHUSETTS.

SEPARATOR-TRAP.

1,085,135.     Specification of Letters Patent.     Patented Jan. 27, 1914.

Application filed August 25, 1913. Serial No. 786,380.

*To all whom it may concern:*

Be it known that I, EDWARD C. KELLY, Jr., a citizen of the United States, and resident of Boston, in the county of Suffolk and State of Massachusetts, have invented new and useful Improvements in Separator-Traps, of which the following is a specification.

My invention relates to separator traps of that class shown and described in United States Letters Patent No. 1,005,433, granted to me October 10, 1911, adapted to separate water from lighter liquids, such as gasolene, oils and grease, which mix more readily with water and separate therefrom more slowly than is the case with more viscous oils. The separator trap shown and described in my said patent and in my United States Patent No. 1,069,789, dated August 12, 1913, fulfil their purposes under usual conditions arising in service, and the improvements herein described are peculiarly adapted for use under conditions where it is necessary to separate heavy oils and grease from the water with which they have been mixed. It will, however, be understood that the utility of the herein described improvements is not limited to such specific use.

Referring to the drawings which illustrate an embodiment of my invention,—Figure 1 shows, partly in section and partly in elevation, an apparatus embodying my invention; Fig. 2 is a detail view, partly in section and partly in elevation, of the receiving and collecting chambers; and Fig. 3 is a plan view of the partition or dam of the collecting chamber.

The separator trap comprises the trap body A, the top of which, A', is open and preferably slopes upward as shown. Upon said top A' there is provided a casing $A^2$ having a cover $A^3$ suitably secured thereto forming a collecting chamber K. Within said casing $A^2$ is the receiving chamber consisting of a vertical pipe or casing B open at its lower end and extending into said trap body A to a point below the normal level of water in said tank. The pipe or casing B is provided with an inlet pipe B' secured at substantially a right angle thereto and extending through the wall of said casing $A^2$. Preferably the pipe or casing B and the inlet pipe B' are formed integral as shown. The inlet to the trap is at $B^2$ and it will be clear that as the liquids enter the pipe or casing B through the inlet pipe B' they first impinge onto the vertical wall of the pipe or casing B, thus preventing the formation of such a downwardly directing stream as would tend to carry the oil and other lighter liquids mixed with the water through the trap body A into the outlet C.

The collecting chamber K is divided at its lower part into two portions D and D' by a vertical partition or dam E which extends around the pipe or casing B and is preferably formed integral with the top A' of the trap body A. The said partition or dam E is provided with a plurality of vertical slots or outlets e of different lengths adapted to permit the oil to flow out of said chamber D into said chamber D'. From the chamber D' issues the oil discharge pipe F which connects with a suitable receptacle G. When now a quantity of water having oil or grease mixed therewith enters the receiving chamber through the inlet pipe B', it impinges upon the vertical wall of the pipe or casing B and is broken up so that there is no opportunity for the siphon action of the trap to carry the oil or grease with the water through the outlet C. The oil or grease which thus enters the trap body A rises and either returns to the top of the water in the casing B or is conducted by the upwardly sloping walls of the top A' into the chamber D of the collecting chamber and into the space between that portion of the casing B which extends into the trap A and said top A' which forms in effect an extension of the chamber D. The levels of the liquids under normal conditions are shown at P and P', P being the water level and P' the oil or grease level. Upon the influx of a fresh quantity of liquid the static balance is momentarily disturbed and the liquids in chamber D rise quickly and without appreciable agitation, this rise of liquids in the chamber D will bring the level P' momentarily to or above the level of the outlets e and a portion of the liquid will then flow through said outlets into the chamber D' and thence through the discharge pipe F into the receptacle G.

Preferably the outlets or slots e in the partition or dam E are of different lengths as shown. The longer slots or outlets extend from the top of the partition or dam to a point just above the normal level of the oil P', so that in the rise of the liquids in the chamber D upon the usual influx of a fresh supply a number of outlets are provided through which the oil readily flows into the chamber D'. Sometimes, however, liquids in more than the usual quantity rush suddenly and violently into the tank A thus causing the liquids in the chamber D to rise quickly up to the edge of the partition or dam E or even to overflow at the top thereof. It will be clear that when the above described action occurs the unseparated liquid in the tank A enters the chamber D and will overflow into the chamber D' and pass thence into the receptacle G until the normal static balance is restored and the liquids in said chamber fall below the level of the outlets $e$. To prevent as far as possible this undesirable passage of unseparated liquids into the receptacle G, some of the outlets $e$ preferably extend but a comparatively short distance from the top of the partition or dam E thus providing outlets for the oil or grease when it rises high in the chamber and preventing the overflow of the unseparated liquids except through the longer slots or outlets unless under extraordinary conditions, which as a practical matter are of rare occurrence, it rises above the level of said shorter outlets.

It will be clear that the disturbance of the liquid impinged against the wall of the casing B on entering through the inlet pipe B' is such that the greater part of the grease or oil will be found in the chamber D and there the liquids are not disturbed except to the extent of rise in response to the change of pressure and each time a fresh supply runs into the trap in any considerable quantity, a portion of the oil or grease flows from the chamber D through the outlets $e$ into the chamber D' and thence through the pipe F into the receptacle G.

I claim:

1. A separator trap comprising a trap body, a receiving chamber and a collecting chamber, said collecting chamber having a dam extending around said receiving chamber and provided with outlets consisting of vertical slots of different lengths.

2. A separator trap, comprising a trap body open at its top and having a receiving chamber extending below the normal level of liquid in the trap, a collecting chamber mounted on said trap body and having a vertical partition or dam dividing said chamber into two portions at the lower part thereof, said partition or dam extending around said receiving chamber and provided with outlets at varying distances from the top thereof.

3. A separator trap, comprising a trap body open at its top, a vertical casing, open at its bottom extending below the normal level of liquid in said trap, an inlet pipe connecting with said casing and extending laterally thereto, a collecting chamber mounted on said trap body and having a vertical partition or dam dividing said chamber into two portions at the lower part thereof, said dam extending around said vertical casing and provided with outlets at varying distances from the top thereof.

4. A separator trap, comprising a trap having an open, upwardly sloping top, a vertical casing open at its bottom and extending below the normal level of liquid in said trap, an inlet pipe connecting with said casing and extending laterally thereto, a casing mounted on said trap body and forming a collecting chamber, a vertical partition or dam within said chamber dividing it into two portions at the lower end thereof, said dam extending around said vertical casing and provided with outlets at varying distances from the top thereof, an outlet from said collecting chamber above the normal level of liquid in said trap and a receptacle with which said outlet communicates.

5. A separator trap, comprising a trap having an open upwardly sloping top, a vertical casing open at its bottom and extending below the normal level of liquid in said trap, an inlet pipe connecting with said casing and extending laterally thereto, a casing mounted on said trap body and forming a collecting chamber, a vertical partition or dam within said chamber dividing it into two portions at the lower part thereof, said dam extending around said vertical casing and provided with vertical slots of different lengths, an outlet from said collecting chamber above the normal level of liquid in said trap and a receptacle with which said outlet communicates.

Signed by me at Boston, Massachusetts, this 20th day of August, 1913.

EDWARD C. KELLY, Jr.

Witnesses:
ROBERT CUSHMAN,
JOSEPHINE H. RYAN.